E. A. PLONCARD.
LOCKING DEVICE FOR SCREW BOLTS AND NUTS.
APPLICATION FILED AUG. 29, 1910.
1,015,763.
Patented Jan. 23, 1912.
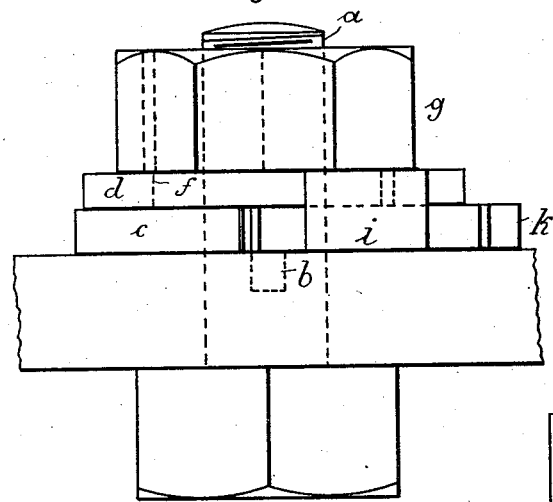
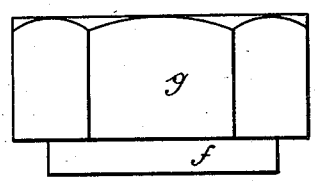
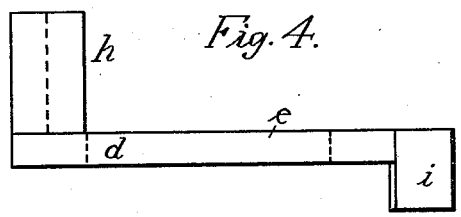
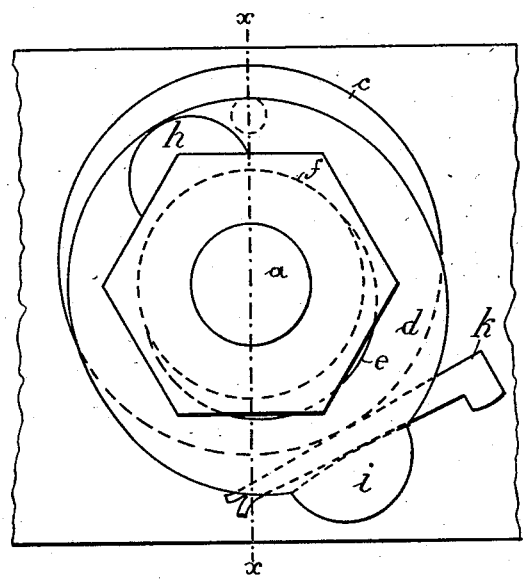
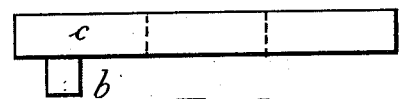
Witnesses.
Inventor.

UNITED STATES PATENT OFFICE.

EUGÈNE ANTOINE PLONCARD, OF MATANA, EGYPT.

LOCKING DEVICE FOR SCREW BOLTS AND NUTS.

1,015,763. Specification of Letters Patent. Patented Jan. 23, 1912.

Application filed August 29, 1910. Serial No. 579,605.

*To all whom it may concern:*

Be it known that I, EUGÈNE ANTOINE PLONCARD, a citizen of the Republic of France, and residing at Matana, Upper Egypt, have invented a new and useful Locking Device for Screw Bolts and Nuts, of which the following is a specification.

The annexed drawing shows a constructional form of my invention by way of an example.

Figure 1 is an elevation and Fig. 2 is a plan of the means for locking screw-nuts; Figs. 3, 4 and 5 show details.

Upon the bolt $a$ is placed a washer $c$ provided with a pin $b$ which prevents it from turning. The hole of the washer is slightly out of the center about 5 or 6 mm. Another washer $d$ with an oval hole $e$ is placed over the washer $c$ and receives the reduced circular neck $f$ of the screw-nut $g$, said neck having free play in the hole $e$. The washer $d$ is provided with an upwardly projecting claw $h$, which embraces the corner edge of the screw-nut $g$ in the sense of the loosening of the latter nearest the center line $x$—$x$ drawn through the centers of the bolt $a$ and the washer $c$. The washer $d$ is further provided with a downwardly directed claw $i$ so disposed as to leave space between its inner face and the periphery of the washer $c$ for the introduction of a wedge $k$ with split end or the like. The wedge $k$ enables the claw $h$ to be tightly drawn against the corner of the nut $g$ so as to prevent the latter from turning. The locking washers can also be applied to the head of screw-bolts.

What I do claim as my invention, and desire to secure by Letters Patent, is:—

In a locking device for screw bolts and nuts the combination of a washer, having retaining means for preventing turning, with an upper washer having an oval hole for receiving the reduced circular neck of the screw-nut, an upper rear claw for engagement with the corner of the screw nut or bolt head, and a lower front claw adapted to receive between it and the said lower washer a wedge for use in drawing the upper claw tight against the nut or bolt-head.

In testimony whereof I have signed my name to this specification in presence of two subscribing witnesses.

EUGÈNE ANTOINE PLONCARD.

Witnesses:
ARTHUR ROBERT CALLENDER,
RAFFAELLO ZAMPINI.

Copies of this patent may be obtained for five cents each, by addressing the "Commissioner of Patents, Washington, D. C."